(12) United States Patent
Kim et al.

(10) Patent No.: US 7,048,381 B2
(45) Date of Patent: May 23, 2006

(54) CYLINDRICAL LENS ARRAY FOR SCROLLING COLORS, PROJECTION SYSTEM USING SAME, AND SCROLLING METHOD

(75) Inventors: Dae-sik Kim, Gyeonggi-do (KR); Kun-ho Cho, Gyeonggi-do (KR); Sung-ha Kim, Gyeonggi-do (KR); Hee-joong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/651,219

(22) Filed: Aug. 29, 2003

(65) Prior Publication Data

US 2004/0119947 A1   Jun. 24, 2004

(30) Foreign Application Priority Data

Aug. 30, 2002   (KR) ............... 10-2002-0051996

(51) Int. Cl.
*G03B 21/00* (2006.01)
*G03B 21/14* (2006.01)
*G03B 21/20* (2006.01)
*H04N 9/12* (2006.01)

(52) U.S. Cl. .......................... 353/38; 353/31; 353/102; 348/742; 348/743

(58) Field of Classification Search ............... 353/31, 353/34, 37, 84, 94, 97, 99, 101, 102, 69, 353/121, 38; 348/742, 743, 759; 349/5, 349/7, 8; 362/293
See application file for complete search history.

(56) References Cited

U.S. PATENT DOCUMENTS 4,870,768 A * 10/1989 Watt et al. .................... 40/430

(Continued)

FOREIGN PATENT DOCUMENTS

CN          1217480         5/1999

(Continued)

OTHER PUBLICATIONS

"Projection Displays," Stupp et al., copyright 1999, John Wiley & Sons Ltd. Appendix 4, p. 388.*

*Primary Examiner*—Melissa Jan Koval
(74) *Attorney, Agent, or Firm*—Staas & Halsey LLP

(57) ABSTRACT

A cylindrical lens array for achieving color scrolling, a projection system using the cylindrical lens array, and a scrolling method. The cylindrical lens array is formed by arranging lens cells in an endless track. When the cylindrical lens array rotates, light rays passing through the lens cells advance along different paths. The projection system includes a light source, the cylindrical lens array, a light splitter, a light valve, and a projection unit. The light source emits a light. The cylindrical lens array has a plurality of lens cells arranged in an endless track and scrolls color bar images upon rotation. The light splitter splits incident light emitted from the light source into color beams according to a wavelength. The light valve receives the color beams split by the light splitter and scrolled by the cylindrical lens array and forms a color image by turning pixels on or off according to an input image signal. The projection lens unit magnifies the color image formed on the light valve and projects the magnified image onto a screen.

17 Claims, 7 Drawing Sheets

U.S. PATENT DOCUMENTS

| | | | | |
|---|---|---|---|---|
| 5,312,284 | A | * | 5/1994 | Grober et al. ............... 446/143 |
| 5,704,061 | A | * | 12/1997 | Anderson ................... 396/330 |
| 5,845,981 | A | * | 12/1998 | Bradley ....................... 353/76 |
| 6,361,172 | B1 | | 3/2002 | Brennesholtz ............... 353/81 |
| 6,511,186 | B1 | * | 1/2003 | Burstyn et al. ............... 353/76 |
| 6,563,551 | B1 | * | 5/2003 | Janssen et al. .............. 348/759 |
| 6,619,802 | B1 | * | 9/2003 | Janssen et al. ................ 353/31 |
| 2003/0184831 | A1 | * | 10/2003 | Lieberman ................... 359/32 |

FOREIGN PATENT DOCUMENTS

WO     WO 02/13541     2/2002

* cited by examiner

CYLINDRICAL LENS ARRAY FOR SCROLLING COLORS, PROJECTION SYSTEM USING SAME, AND SCROLLING METHOD

CROSS-REFERENCE TO RELATED APPLICATIONS

This application claims the benefit of Korean Application No. 2002-51996, filed Aug. 30, 2002, in the Korean Intellectual Property Office, the disclosure of which is incorporated herein by reference.

BACKGROUND OF THE INVENTION

1. Field of the Invention

The present invention relates to a cylindrical lens array, a projection system using the same, and a scrolling method, and more particularly, to a cylindrical lens array which is optically efficient and compact, a projection system using the cylindrical lens array, and a method of scrolling color beams.

2. Description of the Related Art

Projection systems are classified into 3-panel projection systems and single-panel projection systems according to the number of light valves for controlling the on/off operation of light emitted from a high-output lamp on a pixel-by-pixel basis and forming a picture. Single-panel projection systems can have a smaller optical system than three-panel projection systems but provide an optical efficiency of ⅓ of that of three-panel projection systems because the red (R), green (G), and blue (B) colors into which white light is separated are used in a sequential method. Hence, attempts to increase the optical efficiency of single-panel projection systems have been made.

Generally, in a single-panel projection system, light radiated from a white light source is separated into R, G, and B colors using a color filter, and the three colors are sequentially sent to a light valve. The light valve appropriately operates according to the sequence of colors received and creates images. As described above, a single-panel optical system sequentially uses colors, so the light efficiency is reduced to ⅓ of the light efficiency of a three-panel optical system. A scrolling method has been proposed to solve this problem. In a color scrolling method, white light is separated into R, G, and B colors, and the three colors are sent to different locations on a light valve. Since an image cannot be produced until all of the R, G, and B colors for each pixel reach the light valve, color bars are moved at a constant speed using a variety of methods, thereby achieving scrolling.

In a conventional single-panel scrolling projection system, as shown in FIG. 1, white light emitted from a light source 100 passes through first and second lens arrays 102 and 104 and a polarized beam splitter array 105 and is separated into R, G, and B beams by first through fourth dichroic filters 109, 112, 122, and 139. To be more specific, the red beam R and the green beam G, for example, are transmitted by the first dichroic filter 109 and advance along a first light path I1, while the blue beam B is reflected by the first dichroic filter 109 and travels along a second light path I2. The red beam R and the green beam G on the first light path I1 are separated by the second dichroic filter 112. The second dichroic filter 112 transmits the red beam R along the first light path I1 and reflects the green beam G along a third light path I3.

As described above, the light emitted from the light source 100 is separated into the red beam R, the green beam G, and the blue beam B, which are scrolled while passing through corresponding first through third prisms 114, 135, and 142. The first through third prisms 114, 135 and 142 are disposed on the first through third light paths I1, I2, and I3, respectively, and rotate at a uniform speed such that R, G, and B colors are scrolled. I2 includes a mirror 133. The green beam G and the blue beam B that travel along the second and third light paths I2 and I3, respectively, are transmitted and reflected by the third dichroic filter 139, respectively, and then combined. Finally, the R, G, and B beams are combined by the fourth dichroic filter 122. The combined beam is transmitted by a polarized beam splitter 127 and forms a picture using a light valve 130.

The scrolling of the R, G, and B color bars due to the rotation of the first through third prisms 114, 135, and 142 is shown in FIG. 2. Scrolling represents the movement of color bars formed on the surface of the light valve 130 when prisms corresponding to the R, G, and B colors are synchronously rotated.

The light valve 130 processes picture information depending on an on-off signal for each pixel and forms a picture. The formed picture is magnified by a projecting lens (not shown) and is projected onto a screen.

Since such a method is performed using a light path provided for each color, a light path correction lens must be provided for each color, and a component for re-collecting separated light beams must also be provided for each color. Accordingly, an optical system becomes larger, and the yield degrades due to a complicated manufacturing and assembling process. In addition, a large amount of noise is generated by the three motors which rotate the first through third prisms 114, 135, and 142. Still further, the manufacturing costs of a conventional projection system using the above-described method are higher than a color wheel method using only one motor.

In order to produce a color picture using a scrolling technique, color bars as shown in FIG. 2 must be moved at a constant speed. Since the conventional projection system must synchronize a light valve with three prisms in order to achieve scrolling, controlling the synchronization is not easy. Further, because the scrolling prisms 114, 135, and 142 make circular motions while color bar scrolling is rectilinearly performed, the color scrolling speed by the three scrolling prisms is irregular, consequently deteriorating the quality of an image.

SUMMARY OF THE INVENTION

The present invention provides an endless track-like cylindrical lens array designed so that color bars can be scrolled even by using only one cylindrical lens array.

The present invention also provides a single-panel projection system which improves the optical efficiency by using the endless track-like cylindrical lens array and has a minimized volume.

Additional aspects and/or advantages of the invention will be set forth in part in the description which follows and, in part, will be obvious from the description, or may be learned by practice of the invention.

According to an aspect of the present invention, there is provided a cylindrical lens array in which lens cells are arranged to form an endless track and to advance light rays along different paths upon rotation of the cylindrical lens array to achieve color scrolling.

The lens cells may be arranged in a drum shape or various other shapes of a polyprism.

According to another aspect of the present invention, there is provided a projection system, including a light source, a cylindrical lens array, a light splitter, a light valve, and a projection lens unit. The light source emits a light. The cylindrical lens array has a plurality of lens cells arranged in an endless track and scrolls color bar images upon rotation. The light splitter splits incident light emitted from the light source into color beams according to a wavelength. The light valve receives the color beams split by the light splitter and scrolled by the cylindrical lens array and forms a color image by turning pixels on or off according to an input image signal. The projection lens unit magnifies the color image formed on the light valve and projects the magnified image onto a screen.

The light splitter may include first through third dichroic filters, which are inclined at different angles with respect to incident light, split incident light according to wavelength ranges, and advance the color beams at different angles.

The projection system may further include a light path difference corrector, which is disposed on a light path between the cylindrical lens array and the light valve to compensate for differences in light paths of the color beams resulting from the curved shape of the cylindrical lens array.

According to still another aspect of the present invention, there is provided a method of projecting an image, including: emitting a light beam; separating the light beam into a plurality of color beams according to wavelength; scrolling the color beams by rotating an optical element having a plurality of lens cells arranged in a loop; focusing the color beams onto a light valve and turning pixels of the light valve one of on and off according to a received image signal so as to form a color image; magnifying the color image; and projecting the magnified color image onto a screen.

According to another aspect of the present invention, there is provided a projection system, including a light source, one cylindrical lens array, a light splitter, a light valve, and a projection lens unit. The light source emits a light. The cylindrical lens array has a plurality of lens cells arranged in an endless track and scrolls color bar images upon rotation. The light splitter splits incident light emitted from the light source into color beams according to a wavelength. The light valve receives the color beams split by the light splitter and scrolled by the cylindrical lens array and forms a color image by turning pixels on or off according to an input image signal. The projection lens unit magnifies the color image formed on the light valve and projects the magnified image onto a screen.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
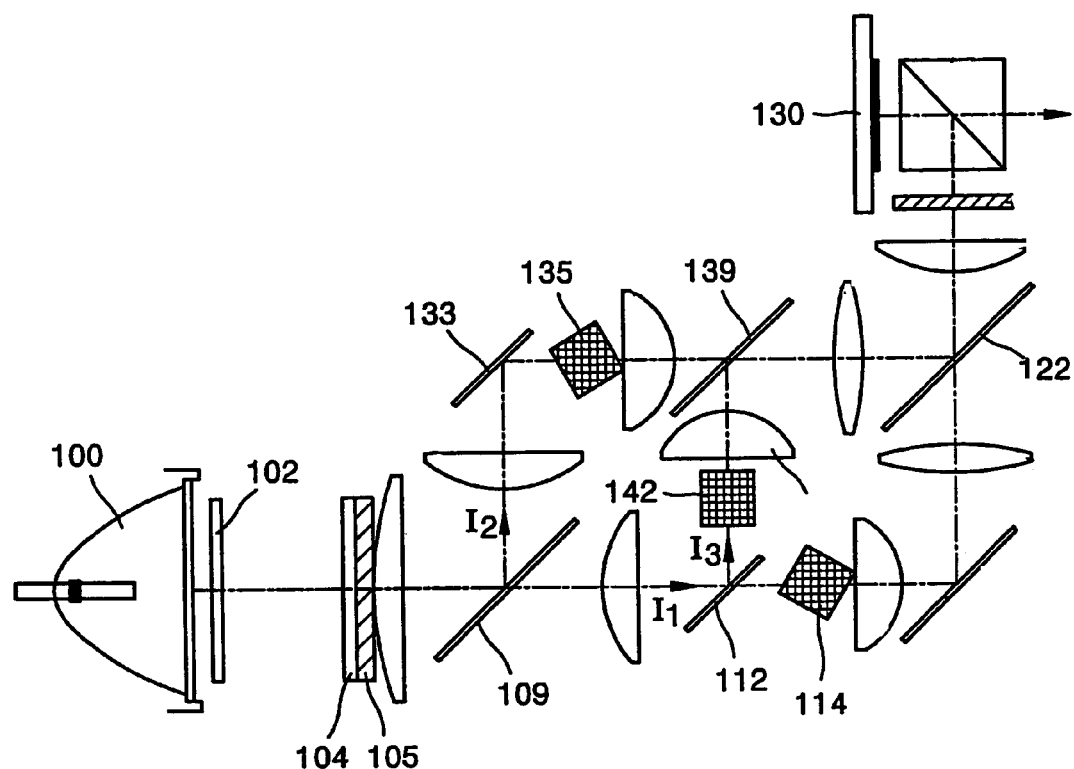
FIG. 1 shows a conventional projection system.
Figure 2:
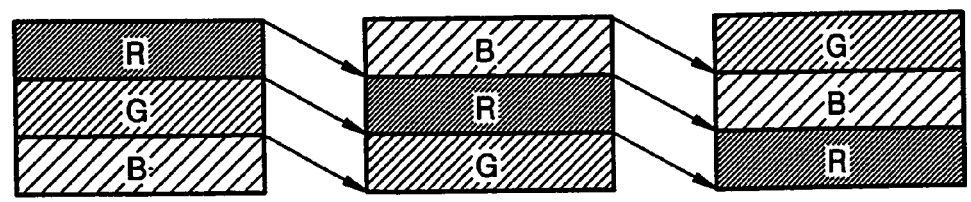
FIG. 2 shows R, G, and B color bars to explain the color scrolling operation of a projection system.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
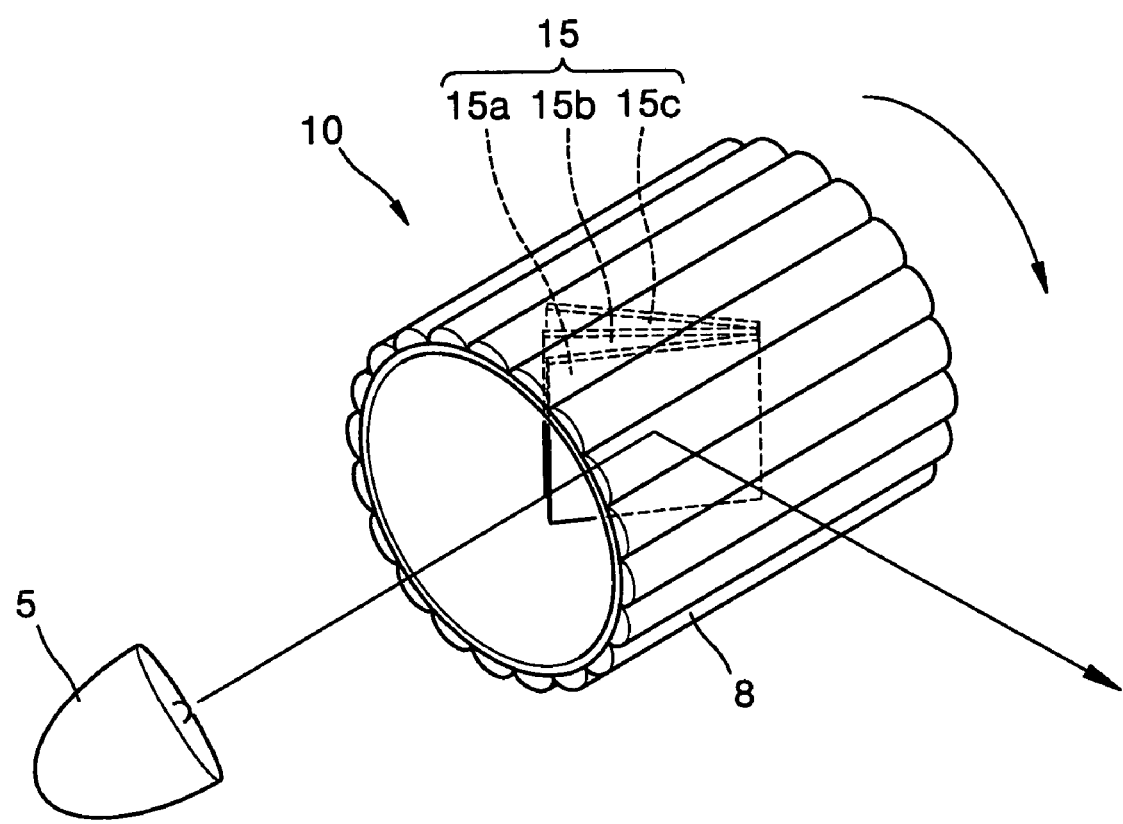
FIG. 3 shows a drum-like cylindrical lens array according to an embodiment of the present invention.

Referring to FIG. 3, a cylindrical lens array, that is, an array of cylindrical lens cells, 10 according to an embodiment of the present invention is formed by arranging cylinder lens cells 8 in a drum shape around a light splitter 15 having first, second, and third dichroic filters 15a, 15b, and 15c, respectively. However, it is to be understood that the cylindrical lens array may be of various other polyprism shapes so long as the cylindrical lens array 10 can rotate as an endless track. As used herein, an endless track is a three-dimensional closed structure (i.e., a loop) rotatable about an axis or axes. When the cylindrical lens array 10 rotates, the positions of the cylinder lens cells 8 change, and accordingly the positions of beam rays originating from a light source 5 and passing through the rotating cylinder lens cells 8 periodically change, thereby achieving color scrolling.

The structure and operation of a projection system using such a cylindrical lens array for achieving color scrolling will now be described.

Figure 4:
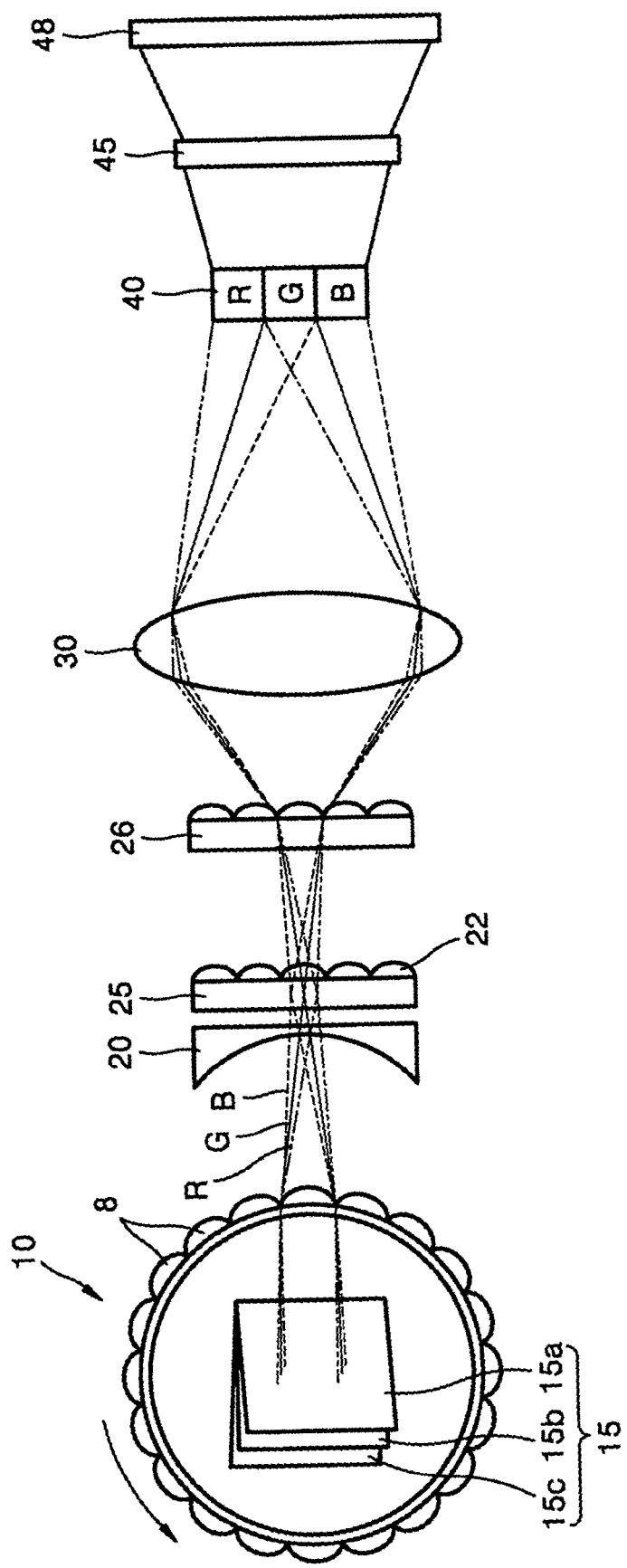
FIG. 4 shows a projection system using the drum-like cylindrical lens array shown in FIG. 3.

Referring to FIG. 4, a projection system according to an embodiment of the present invention includes a light source 5 of FIG. 3 which radiates light, a cylindrical lens array 10 having plural lens cells 8 and which can achieve color scrolling by rotating on an endless track, and a light splitter 15 which is installed in the cylindrical lens array 10 to split light emitted from the light source 5 into color beams.

The light splitter 15 includes first, second, and third dichroic filters 15a, 15b, and 15c inclined at different angles with respect to the incident light axis. The light splitter 15 splits an incident beam according to predetermined wavelength ranges and advances the split beams at different angles. For example, the first dichroic filter 15a reflects a beam in the red wavelength range, an R beam, from a white incident beam and, at the same time, transmits beams in the green and blue wavelength ranges, G and B beams. The second dichroic filter 15b reflects the G beam from the G and B beams transmitted by the first dichroic filter 15a and, at the same time, transmits the B beam. The third dichroic filter 15c reflects the B beam transmitted by the first and second dichroic filters 15a and 15b.

The inside space of the cylindrical lens array 10 is utilized by installing the light splitter 15 therein, so that the size of a projection system is reduced.

The R, G, and B beams into which incident light is separated according to wavelength by the first, second, and third dichroic filters 15a, 15b, and 15c are reflected at different angles. For example, the R and B beams are focused on the same location as the G beam and then made incident upon the cylindrical lens array 10. The separated colors are each scrolled by the cylindrical lens array 10 as it rotates. The beams scrolled by the cylindrical lens array 10 are processed according to an image signal by a light valve 40 to form a color image. The color image formed by the light valve 40 is magnified by a projection lens unit 45 and projected onto a screen 48.

First and second fly-eye lenses 25 and 26 and a relay lens 30 can be further installed on a light path between the cylindrical lens array 10 and the light valve 40.

A light path difference corrector 20 is provided between the cylindrical lens array 10 and the first fly eye lens 15. The function of the light path difference corrector 20 is explained below.

The three beams, namely the R, G, and B beams, obtained by the light splitter 15 are incident upon the individual lens cells 8 of the cylindrical lens array 10. The three color beams incident upon each of the lens cells 8 propogate through the first and second fly-eye lenses 25 and 26 and the relay lens 30 and are focused on respective color areas of the light valve 40, thereby forming color bars. This process will be described in detail later.

Figure 5:
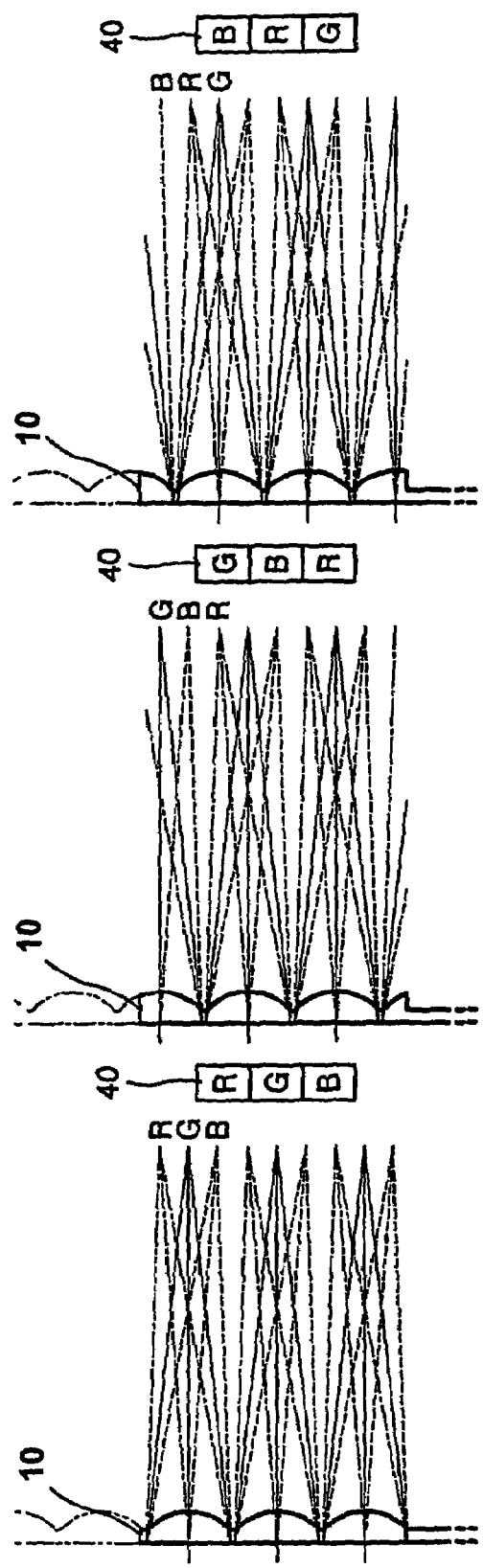
FIG. 5 shows the color scrolling operation caused by the rotation of a cylindrical lens array shown in FIG. 3.

A color scrolling method using only the light splitter 15 and the cylindrical lens array 10 excluding the first and second fly-eye lenses 25 and 26 and the relay lens 30 will now be described with reference to FIGS. 5 and 6A and 6B. Since the cylindrical lens array 10 is in a drum shape, portions through which light penetrate are curved. However, as the portions through which light penetrate are parts of a curved shape, they are shown in a rectilinear shape in FIG. 7.

As the cylindrical lens array 10 rotates at a constant speed, the section of the light-penetrating area of the lens cells 8 of the cylindrical lens array 10 through which the color beams pass appears to reciprocate, that is to move rectilinearly upwardly and downwardly at a constant speed. Hence, the positions of the beams transmitted by the cylindrical lens array 10 are consecutively changed. As the positions of the beams transmitted by the cylindrical lens array 10 change, the areas of the light valve 40 upon which the R, G, and B beams are focused change periodically in units of lens cells 8.

First, light passes through the cylindrical lens array 10 and forms color bars on the light valve 40 in an R, G, then B order. Next, as the cylindrical lens array 10 rotates, the lens surface of the cylindrical lens array 10 gradually moves upward or downward while the light passes through the cylindrical lens array 10. Accordingly, color bars are formed in a G, B, then R order. Then, as the cylindrical lens array 10 continues to rotate, color bars are formed in a B, R, then G order. In other words, the positions of lenses upon which light is incident change with the rotation of the cylindrical lens array 10, and the rotation of the cylindrical lens array 10 simulates a rectilinear motion of the lens cells 8 as viewed from the cross-section of the cylindrical lens array 10. Hence, the positions of color bars are rotated periodically, thereby achieving color scrolling. While such color scrolling is periodically repeated, the individual pixels on the light valve 40 are turned on or off, thereby forming a color image.

A projection system according to the present invention is a single-panel projection system and uses an entire incident beam, thus greatly improving the optical efficiency compared to an existing single-panel projection system using a color wheel. In addition to obtaining an optical efficiency as high as that in three-panel projection systems, the projection system according to the present invention can be significantly minimized in size compared to three-panel projection systems.

As described above, because color scrolling is performed by rotating the cylindrical lens array 10 in one direction without changing the rotating direction, color scrolling can be easily controlled with continuity and consistency. Also, because color scrolling is performed using only one cylindrical lens array, color scrolling can be easily synchronized with the operating frequency of the light valve 40.

The number of lens cells 8 on the cylindrical lens array 10 can be controlled to synchronize the cylindrical lens array 10 with the operating frequency of the light valve 40. That is, if the operating frequency of the light valve 40 is high, more lens cells are included so that the scrolling speed can be increased while keeping the rotation speed of the cylindrical lens array 10 constant.

Alternatively, a cylindrical lens array can be synchronized with the operating frequency of a light value by maintaining the number of lens cells on the cylindrical lens array uniform and increasing the rotation frequency of the cylindrical lens array. For example, when the operating frequency of the light valve 40 is 960 Hz, that is, when the light valve 40 operates at 1/960 of a second per frame such that 960 frames are reproduced per second, the cylindrical lens array 10 can be implemented as follows. If the cylindrical lens array 10 reproduces 32 frames per one rotation, it must rotate 30 times per second in order to reproduce 960 frames per second. In other words, because the cylindrical lens array 10 must rotate 1800 times for 60 seconds, it has a rotation speed of 1800 rpm. When the operating frequency of the light value 40 is increased by half and thus the light valve 40 operates at 1440 Hz, the cylindrical lens array 10 must rotate at a 2700 rpm speed in order to be synchronized with the increased operating frequency of the light valve 40.

Light emitted from the light source 5 is split into three beams, namely the R, G, and B beams, by the light splitter 15. Thereafter, the R, G, and B beams are incident upon the cylindrical lens array 10 and are then focused on the first fly-eye lens 25. Preferably, the first fly-eye lens 25 is located such as to face a focal plane of the cylindrical lens array 10. The lens cells 8 of the cylindrical lens array 10 match with lens cells 22 of the first and second fly-eye lenses 25 and 26 in a one-to-one correspondence. In other words, the first and second fly-eye lenses 25 and 26 are installed so that light transmitted by a lens cell 8 of the cylindrical lens array 10 is incident upon its corresponding lens cell 22 of the first and second fly-eye lenses 25 and 26. The R, G, and B beams are focused on the first fly-eye lens 25 so that beams of the same color are collected together. Thereafter, the R, G, and B beams pass through the second fly-eye lens 26 and the relay lens 30 and are then focused on three respective color areas of the light valve 40. Thus, R, G, and B color bars are formed on the their respective color areas of the light valve 40.

Since the cylindrical lens array 10 has a drum shape, the cross-section of a portion of the cylindrical lens array 10 through which light passes is not rectilinear but curved. Hence, the distance from light passing through the middle of the cylindrical lens array 10 to the first fly-eye lens 25 is different from that of light passing through an edge of the cylindrical lens array 10 to the first fly-eye lens 25, such that rays of the light may be focused on different locations of the first fly-eye lens 25 according to the positions of the lens cells 8, through which the light rays pass. Accordingly, a light path difference corrector 20 is installed on a light path between the cylindrical lens array 10 and the first fly-eye lens 25. The light path difference corrector 20 has a high refractive index and can have various lengths that differ by a light path difference. As the light path difference corrector 20 has a greater refractive index, it can be manufactured to be shorter. An aberration generated when the light path difference corrector 20 is short can be corrected by adjusting the curvature of the incidence plane of the light path difference corrector 20.

Figure 6A:
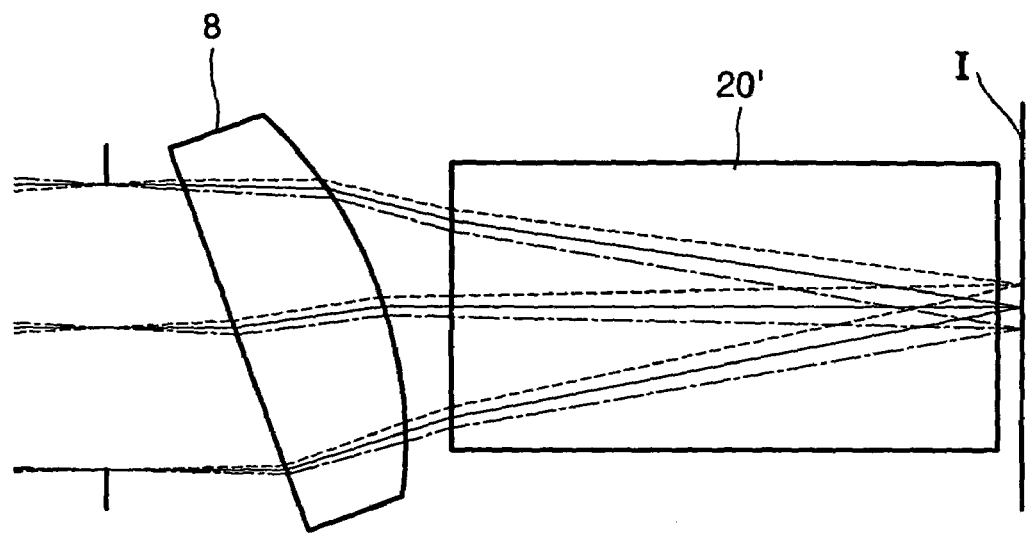
FIGS. 6A and 6B show a process in which a light path difference corrector corrects a light path difference generated due to the drum structure of the cylindrical lens array shown in FIG. 3.
Figure 6B:
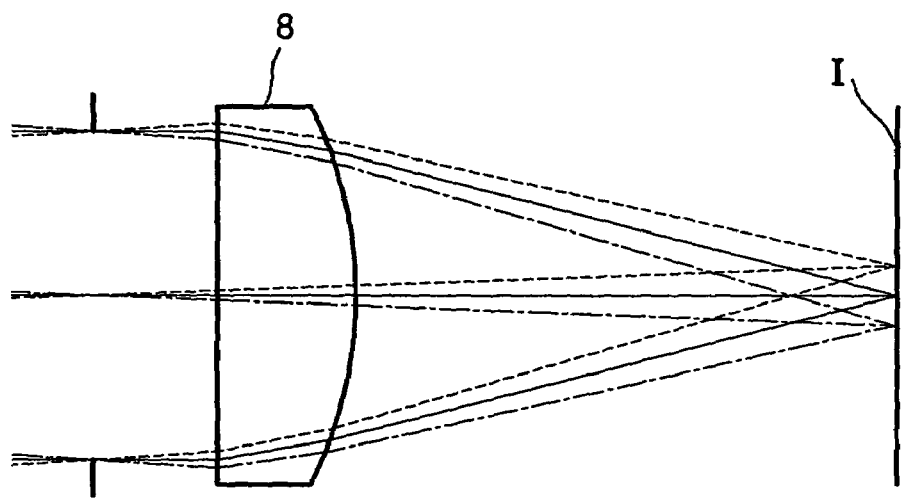

FIG. 6A shows a case in which a lens cell 8 is inclined with respect to an optical axis, and a light path difference corrector 20' is included. FIG. 6B shows a case in which a lens cell 8 stands perpendicularly to the optical axis. In the case of FIG. 6B, no light path difference is generated. It can be seen from FIGS. 6A and 6B that the focal points at which light rays are focused on an image formation surface were properly corrected by the light path difference corrector 20'.

Figure 7:
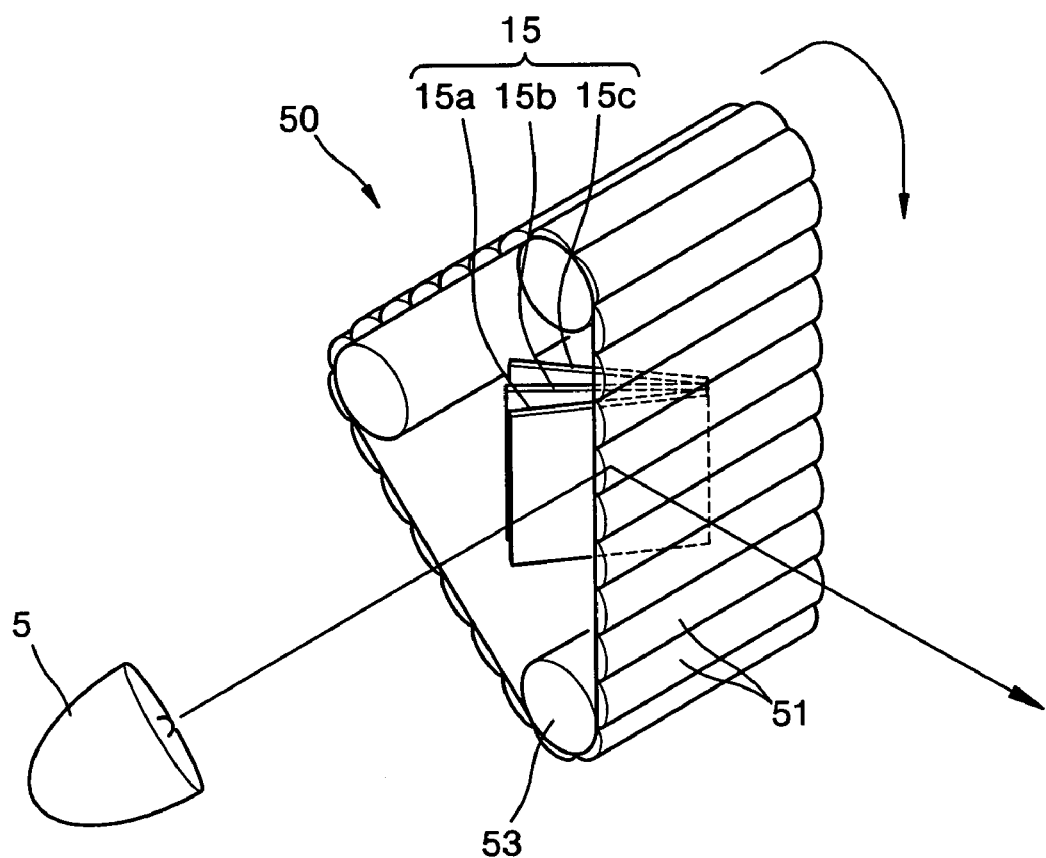
FIG. 7 shows a triangular prism-like cylindrical lens array according to another embodiment of the present invention.

A cylindrical lens array of the present invention can be endless tracks with various polyprism shapes. As shown in FIG. 7, a cylindrical lens array 50 according to a second embodiment of the present invention has a triangular prism shape around a light splitter 15 having first, second and third dichotic filters 15a, 15b, 15c, respectively which split light from a white light source 5. Reference numeral 53 denotes a roller which rolls to rotate the cylindrical lens array 50. Although FIG. 7 takes a triangular prism as an example of the shape of a cylindrical lens array according to the present invention, various polyprism shapes, such as, a quadrangular prism or a pentagonal prism, can be adopted. The lens cells 51 of the cylindrical lens array 50 which scroll the color beams are arranged to be parallel to the rotating axis of the cylindrical lens array 50. The cylindrical lens array 50 having such a configuration is rotated, thus achieving scrolling.

Figure 8:
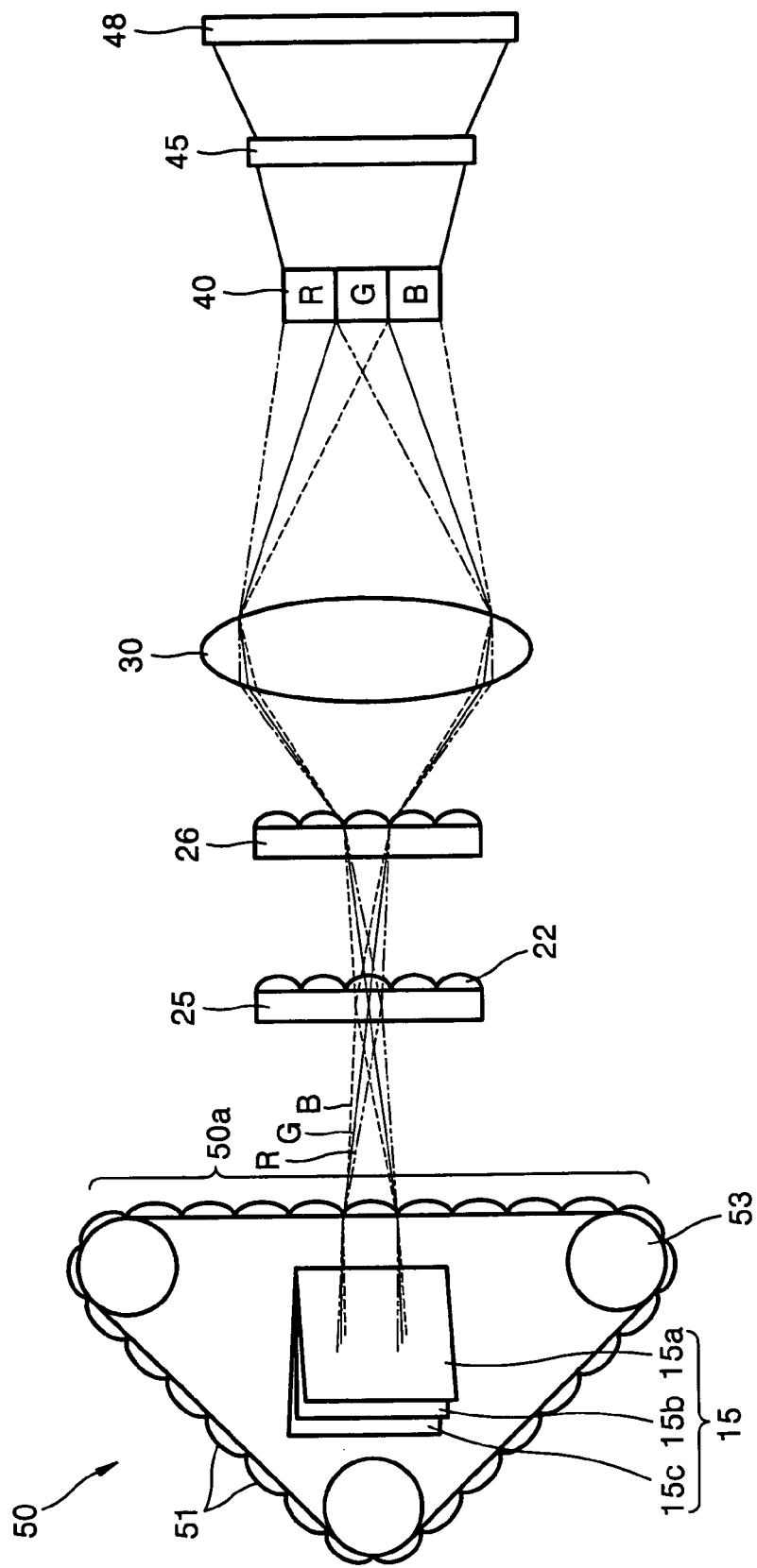
FIG. 8 shows a projection system using the triangular prism-like cylindrical lens array.

A projection system using the triangular prism-like cylindrical lens array 50 to perform color scrolling is shown in FIG. 8. Since the same reference numerals are used to identify like elements in FIGS. 4 and 8, they will not be described in detail.

The light splitter 15 for splitting an incident beam according to color is installed within the cylindrical lens array 50. Three beams, namely the R, G, and B beams, split by the light splitter 15 pass through the cylindrical lens array 50 and are then focused on different areas of the first fly-eye lens 25. Here, the R, G, and B beams split by the light splitter 15 pass through a portion 50a of the cylindrical lens array 50. The portion 50a of the cylindrical lens array 50 through which light passes stands at a right angle with respect to the optical axis. In this case, when the R, G, and B beams split by the light splitter 15 pass through the portion 50a of the cylindrical lens array 50 and are then incident upon the first fly-eye lens 25, a light path difference is not generated. Hence, there is no need to install a light path difference corrector.

Even when the cylindrical lens array 50 has a shape of polyprism other than the triangular prism, a side of the cylindrical lens array 50a through which beams split by the light splitter 15 pass is disposed perpendicular to the optical axis.

The R, G, and B beams transmitted by the cylindrical lens array 50 are focused on different locations of the first fly-eye lens 25. The R, G, and B beams are transmitted to each of the cells of the second fly-eye lens 26, pass through the relay lens 30, and form color images on their respective color areas of the light valve 40. As the cylindrical lens array 50 rotates, color bar images formed on the light valve 40 are periodically scrolled to obtain a color picture.

In a projection system according to the present invention, scrolling can be performed using a single part, that is, a cylindrical lens array according to the present invention. Thus, scrolling is easily controlled, and color beams can be transmitted along only one optical path. Consequently, the number of components is reduced, and a small, cost-efficient projection system can be obtained.

In addition, since the cylindrical lens array according to the present invention has the shape of an endless track (i.e., a loop), color scrolling can be easily performed by the rotation of the cylindrical lens array. Color scrolling can be performed with continuity and consistency at a constant speed.

Since a conventional single-panel projection system produces color images by sequentially separating white light into R, G, and B light beams, the efficiency is degraded to ⅓ of the light efficiency of a three-panel projection system. However, in a single-panel projection system using a scrolling technique according to the present invention, white light is separated into R, G, and B beams at one time, and the R, G, and B beams are scrolled to form a color image. Therefore, the single-panel projection system according to the present invention can obtain the same light efficiency as the light efficiency of a three-panel projection system.

Although a few embodiments of the present invention have been shown and described, the present invention is not limited to the disclosed embodiments. Rather, it would be appreciated by those skilled in the art that changes and modifications may be made in this embodiment without departing from the principles and spirit of the invention, the scope of which is defined by the claims and their equivalents.

What is claimed is:

1. A projection system comprising:
   a light source which emits a light;
   a cylindrical lens array having a plurality of lens cells arranged in an endless track and scrolling color bar images upon rotation;
   a light splitter which splits incident light emitted from the light source into color beams according to a wavelength;
   a light valve which receives the color beams split by the light splitter and scrolled by the cylindrical lens array and forms a color image by turning pixels on or off according to an input image signal; and
   a projection lens unit which magnifies the color image formed on the light valve and projects the magnified image onto a screen,
   wherein the splitting is performed by first through third dichroic filters, which are inclined at different angles with respect to incident light, split incident light according to wavelength ranges, and advance the color beams at different angles.

2. The projection system of claim 1, wherein the lens cells of the cylindrical lens array are arranged in the shape of a drum.

3. The projection system of claim 1, wherein the light splitter splits the light into three color beams, one color beam having a wavelength corresponding to red, one color beam having a wavelength corresponding to green, and one color beam corresponding having a wavelength corresponding to blue.

4. The projection system of claim 1, wherein the light splitter is disposed within the cylindrical lens array and along an axis of rotation thereof.

5. The projection system of claim 1, wherein a scrolling speed of the cylindrical lens array is synchronized with an operating frequency of the light valve.

6. The projection system of claim 1, wherein an increase in one of the number of the plurality of lens cells and the rotational speed of the cylindrical lens array increases the scrolling speed.

7. The projection system of claim 1, wherein a decrease in one of the number of the plurality of lens cells and the rotational speed of the cylindrical lens array decreases the scrolling speed.

8. The projection system of claim 1, wherein the cylindrical lens array rotates in one direction.

9. The projection system of claim 2, further comprising first and second fly-eye lenses which receive the color beams transmitted from the cylindrical lens array and transmit the color beams to the light valve.

10. The projection system of claim 2, further comprising a light path difference corrector disposed on a light path between the cylindrical lens array and the light valve to compensate for differences in light paths of the color beams resulting from the curved shape of the cylindrical lens array.

11. The projection system of claim 2, wherein the cylindrical lens array rotates at a constant speed and direction.

12. The projection system of claim 10, wherein the light path difference corrector has a high index of refraction.

13. The projection system of claim 9, wherein the first and second fly eye lenses have a plurality of two dimensionally arranged lens cells.

14. The projection system of claim 9, wherein the first eye lens is disposed at a focal plane of the cylindrical lens array and the color beams transmitted from the cylindrical lens array are focused on the first fly-eye lens.

15. The projection system of claim 9, further comprising a relay lens disposed on a light path between the second fly-eye lens and the light valve to focus the color beams transmitted by the second fly-eye lens onto respective color areas of the light valve.

16. The projection system of claim 14, wherein lens cells of the cylindrical lens array correspond to the plurality of lens cells of the first and second fly-eye lenses in a one-to-one relationship such that color beams transmitted by one of the plurality of lens cells of the cylindrical lens array are incident on a corresponding lens cell of the first fly-eye lens and thereafter transmitted to a corresponding lens cell of the second fly-eye lens.

17. A method of projecting an image, comprising:

emitting a light beam;

separating the light beam into a plurality of color beams according to wavelength;

scrolling the color beams by rotating an optical element having a plurality of cylindrical lens cells arranged in a loop;

focusing the color beams onto a light valve and turning pixels of the light valve one of on and off according to a received image signal so as to form a color image;

magnifying the color image; and projecting the magnified color image onto a screen, wherein the separating is performed by first through third dichroic filters, which are inclined at different angles with respect to incident light, split incident light according to wavelength ranges, and advance the color beams at different angles.

* * * * *